United States Patent [19]
Knecht

[11] 3,897,020
[45] July 29, 1975

[54] CUTTER KNIFE FOR THE PREPARATION OF MEAT

[75] Inventor: Fritz Knecht, Heissen, Germany

[73] Assignee: Firma Techmed AG, St. Margrethen, Switzerland

[22] Filed: Aug. 31, 1973

[21] Appl. No.: 393,483

[30] Foreign Application Priority Data
Aug. 31, 1972  Germany............................ 2242778
July 27, 1973  Germany............................ 2338145

[52] U.S. Cl. ................. 241/292.1; 83/665; 83/675
[51] Int. Cl. ............................................ B02c 18/18
[58] Field of Search ........... 241/292.1, 300; 83/665, 83/675, 356.3

[56] References Cited
UNITED STATES PATENTS

| | | | |
|---|---|---|---|
| 564,747 | 7/1896 | Gutenkunst.................. | 241/292.1 X |
| 1,279,103 | 9/1918 | Griese......................... | 241/292.1 X |
| 1,780,247 | 11/1930 | Simpson....................... | 241/292.1 X |
| 2,836,889 | 6/1958 | Joyet et al. .................. | 83/665 X |
| 3,598,010 | 8/1971 | Chambon........................ | 83/675 |
| 3,631,907 | 1/1972 | Laska............................ | 241/292.1 |
| 3,730,363 | 5/1973 | Karpf....................... | 241/292.1 UX |

FOREIGN PATENTS OR APPLICATIONS
1,097,310  1/1961  Germany......................... 241/292.1

Primary Examiner—Granville Y. Custer, Jr.
Assistant Examiner—Howard N. Goldberg
Attorney, Agent, or Firm—Ernest G. Montague; Karl F. Ross; Herbert Dubno

[57] ABSTRACT

A cutter knife for meat comprises a blade, a knife shaft and a fastening device. A holding disc has a central receiving hole formed as a regular polygon and adapted to serve as a form-locked connection with a polygonal receiving part of the knife shaft. The blade has a cutting edge and a knife tip. The cutting edge terminates before the start of the knife tip, so that the resharpening of the cutting edge is limited to the face of the blade, and the radial distance between the knife tip and the axis of the knife shaft remains unchanged upon resharpening.

5 Claims, 8 Drawing Figures

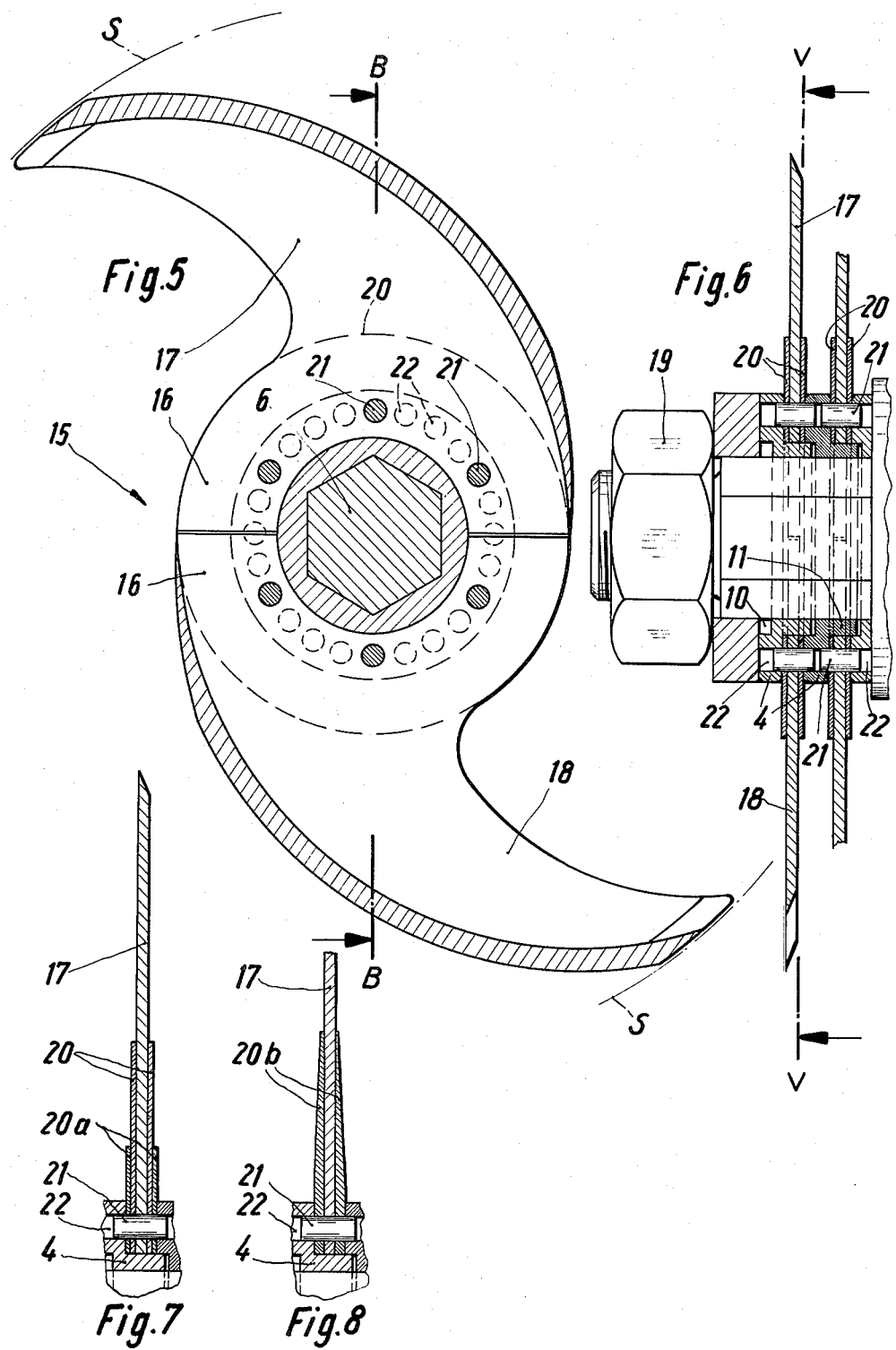

CUTTER KNIFE FOR THE PREPARATION OF MEAT

The present invention relates to a knife for meat having a fastening device, to which each blade is connected, locked for rotation with a holding disk; the disk has a central receiving hole in the form of a regular polygon, and serving for form-locked connection with a multi-sided, for instance six-sided, receiving part of the knife shaft.

In one such known device, the holding disk has means by which the blade can be displaced radially. This serves to adjust the radius of rotation of the cutting edge or point of the blade, respectively, with respect to the rotating concavely curved wall of the meat-receiving bowl in such manner that the smallest possible distance remains between the wall and the knife. This time-consuming adjustment of the knife is necessary upon every change of blade. The radius of rotation of the knife is not fixed, since it becomes somewhat smaller upon each sharpening.

It is an object of the present invention to provide a system for fastening cutter blades in which such drawbacks are eliminated and in which the cumbersome adjustment or readjustment of the cutter blades is no longer necessary, and the structural and operational properties of the knife are improved.

According to the present invention I provide cutters or knives such that the cutting edge of the blade terminates before the start of the blade tip, so that the resharpening of the cutting edge is restricted to the face of the blade and the radial distance between the tip of the blade and the axis of the knife shaft remains unchanged upon resharpening.

As a result of this measure pursuant to the present invention, an adjustment or readjustment of the knife is no longer necessary, so that the mounting or dismounting of a set of knives can be effected incomparably faster than heretofore, without the danger of injury or of, wrong adjustment.

A further feature of the present invention resides in that the blade is fastened to its holding disk by two screws, whose holes in the blade lie diametrically of the axis of the shaft and on a pitch circle concentric with said shaft, while the holding disk is provided with four holes for the mentioned screws. These holes are so arranged on the pitch circle that the lines connecting every two bores or holes, lying diametrically opposite each other, will, in the case of a twelve-cornered receiving opening of the holding disk, intersect at an angle of 75° or 150°.

In this way, there results twenty-four positions of attachment of the blade at angular distances of 15° apart. This makes possible groupings of two, three, four, six, eight and twelve blades distributed in fan-like fashion uniformly over the circumference on the knife shaft; in addition knife sets can be formed, of five or seven blades each, these blade groups being arranged symmetrically with respect to the axis of the shaft.

The system of fastening the blades in accordance with the present invention also provides assurance that, in contradistinction to the known designs, the holding disks and the blades form a completely closed hub so that small pieces of meat cannot become caught in gaps or inaccessible corners. In this way there is obtained a substantial improvement in hygiene and the cleaning of the knife head is simplified.

The present invention is also directed at improvements in operation of the knives such that the breaking of the blades at high speeds of rotation is avoided and the noise level is decreased.

These and other objects will become more readily apparent from the following detailed description, reference being made to the accompanying drawing, in which:

FIG. 5 is an elevational section of a knife unit taken along the line V—V of FIG. 6;

FIG. 6 is a section taken along the line B—B of FIG. 5; and

FIGS. 7 and 8 are sectional views of further embodiments.

Figure 1:
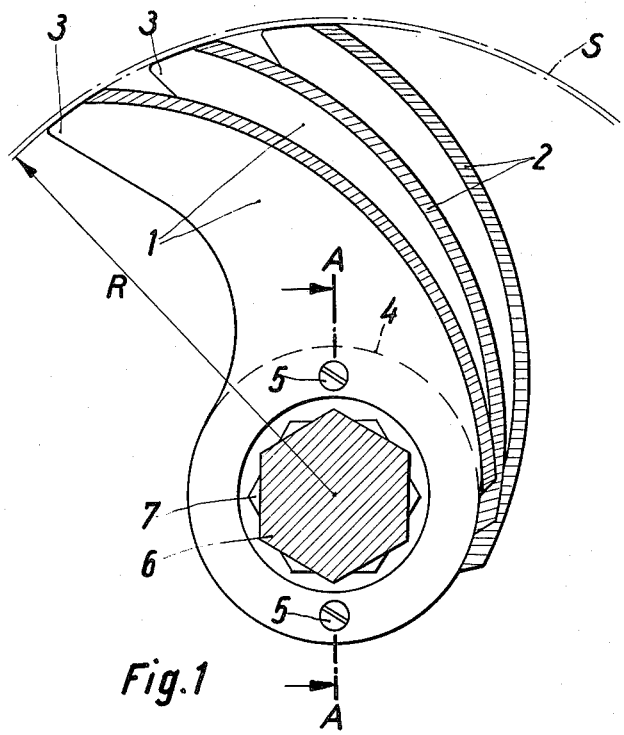
FIG. 1 is a perspective view of a cutter blade with a holding disk.

An arcuate cutter knife (FIGS. 1–4) has a convex cutter edge 2, which terminates ahead of the knife tip 3, so that upon the resharpening of the leading cutting edge 2 or the face of the blade, the radius R is not changed. Accordingly, when it is mounted, the blade need no longer be adjusted with respect to the edge of the bowl S, and can be firmly connected with the holding disk 4 by means of two screws 5. These screws are arranged diametrically with respect to the axis of the knife shaft 6. The receiving part of the knife shaft is multi-edged and polygonal, for example, a hexagon, while the receiving opening 7 of the holding disk is a regular dodecagon. In this way it is possible to form blade sets in which the blades are arranged one behind the other and with angular offsets of 30° apart in a circle (FIG. 1). The tip 3 is formed at the junction of the concave trailing edge and the circular arc segmental outer edge of the blade.

Figure 2:
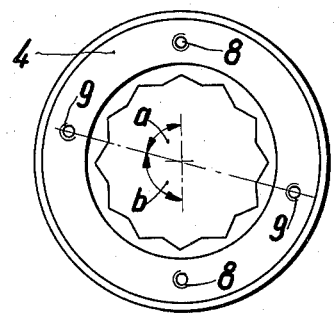
FIG. 2 is an elevational view of the holding disk.

In order to increase the possible variations, the holding disk 4, as can be noted from FIG. 2, is provided with a total of four bore 8 and 9 for the fastening screws, which are so arranged on a common pitch circle, that the diametral connecting line of the bores 8 intersects that of the bores 9 at an angle "$a$" of 75° or an angle "$b$" of 105°. Thus the individual holding disks cannot only be arranged 30° apart on the hexagon of the knife shaft, but in addition there is the possibility of using the bores 8 or the bores 9 alternately for fastening the knife 1 to the holding disk 4, so that the knives can be arranged also 15° apart and it is possible to form a fanned array of twenty-four blades arranged one behind the other in the circle. In this way the number of possible groupings is also substantially increased, to regulate the degree of comminution and the emulsifying action.

Figure 3:
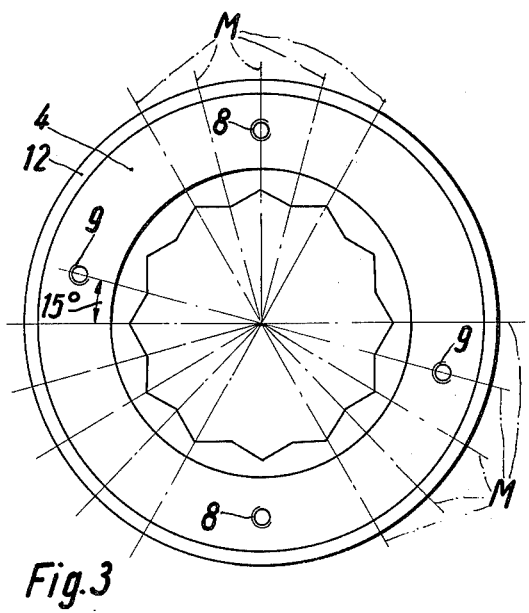
FIG. 3 is a similar view of the holding disk for a grouping of blades.

In FIG. 3 there is shown the formation of three blade groups of five blades each, indicated as middle lines M. The groups are distributed uniformly (equispaced) in a circle in order to avoid any imbalance. Many other groupings can be formed in corresponding manner, which would not be possible without the arrangement in accordance with the present invention of the fastening bores 8 and 9 in the holding disk 4.

Figure 4:
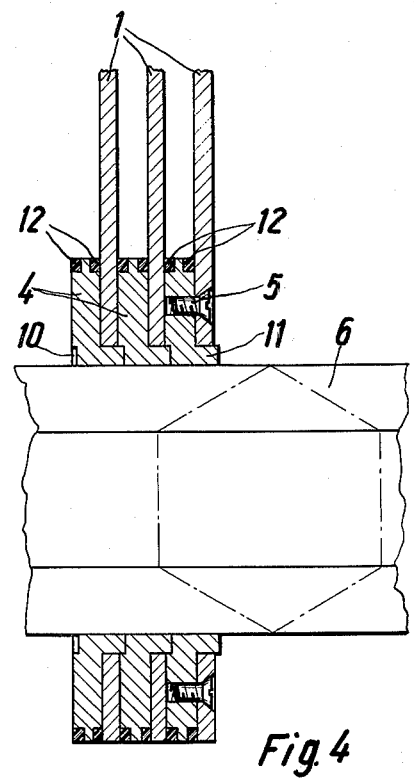
FIG. 4 is a section taken along the lines A—A of FIG. 1 (on a larger scale)

FIG. 4 shows the knife or blade set. The holding disks 4 with the blades 1 fastened on them are placed closely alongside of each other on the hexagon of the knife shaft 6 and clamped axially and held in known manner (not shown). For the form-locked connection between the blade 1 and the holding disk 4, the latter is provided with a concentric recess 10 on one side and on the other side with a concentric hub projection 11, which fits into the receiving bore of the blade, the edge of the projection 11 which protrudes beyond the knife extends into the recess 10 of the adjoining holding disk.

In order to avoid the formation of cracks in the knife blade, the outer edge of the holding disk 4 is formed on both faces with an inlay 12 of elastomeric plastic or synthetic material, so that a certain resilience is provided between the edge of the holding disk and the knife blade, as a result by which, chisel action of the edge of the holding disk is eliminated.

Furthermore, this measure provides an additional sealing action at the place of fastening, which assists in avoiding the penetration of particles of meat and foci for bacteria multiplication.

In the embodiment shown in FIGS. 5 to 8, a knife-blade unit 15 has open blade bases 16, or blade feet, the unit is therefore formed of two individual blades 17 and 18 such that the bases 16 of these blades are fastened with axial symmetry on the knife shaft 6. In this case the receiving part of the knife shaft 6 is also formed as a hexagon, while the hub projection 11 of the holding disks 4 is circular.

As shown in FIG. 6, the holding disks 4 with the knife blades 15 fastened to them are placed closely alongside of each other on the hexagonal of the knife shaft 6 and clamped axially by the threaded nut 19. The form-locked connection of the individual blades 17 and 18 is also assured by the recess 10 and the hub projection 11.

There are also provided circular supporting plates 20 which lie closely against both sides of the knife blades 17, 18 and consists of elastic material of high strength, for instance spring steel. These plates are pressed by the holding disks 4 against the knife blades 17, 18 and create a vibration-damping transition between the free part of the blades 17, 18 and the points of clamping. The diameter of the supporting plates 20 should preferably not be greater than the diameter of the circular blade base or blade foot.

As shown in FIG. 7, a plurality of supporting plates 20, 20a which rest against each other can also be inserted, particularly in the case of larger knife blades. The vibration-damping effect desired thereby is further increased if these plates are made of different thickness.

Instead of a plurality of supporting plates, it is also possible to use only one elastic supporting plate 20b (FIG. 8), whose cross section tapers continuously or stepwise in the direction of the blade cutting edge, so that this plate in itself already exhibits resiliency with strongly damped vibration.

The damping of the blade vibrations obtained by the insertion of the supporting plates 20, 20a, 20b has the result that the breakage of the knife blades due to vibration can no longer occur. Furthermore, the blades can be made somewhat thinner than heretofore, which has a favorable effect with respect to the resultant centrifugal force, the bearing load, the removal of heat, and the cost of manufacture. Furthermore, such knife arrangements are also better suited for the recently preferred working of frozen meat than was previously the case, since here the danger of breakage due to vibration is particularly great. Furthermore, it is possible to operate with substantially higher speeds of rotation which shorten the cutter time.

In order to fix the knife blades 17 and 18 in position, at least two diametrically arranged holding bolts 21 are forced axially into each knife-blade unit in such manner that the bolt protrudes on both sides of the blade. Upon the mounting of the knife-blade unit, the holding bolts are placed to the bores 22 of the supporting plates and holding disks 4, so that a form-locked positioning of the parts forming the knife set is assured, the position of the knife set with respect to the edge S of the bowl remaining unchanged even after resharpening.

Corresponding to the number of bores 22 (preferably 24), the knife blades can be arranged in an equal number of different positions, so that a very diversified possibility of combinations for the formation of knife groups results. In this way, due to the nature of the knife groupings used, the speed of passage of the material to be cut through the knife head can be controlled and the degree of comminution or the emulsifying action can be adapted to the type of sausage or of meat to be produced.

I claim:

1. A cutter for the comminution of meat, comprising:
a knife shaft having a polygonal configuration;
a plurality of holding discs mounted on said shaft, each of said holding discs having a polygonal hole in form-fitting engagement with the polygonal shaft; and
a plurality of knife blades each carried by a respective one of said discs and having a convex cutting edge, a concave trailing edge, and an outer edge defining with said trailing edge a tip, said cutting edge terminating ahead of said tip whereby resharpening of the cutting edge is limited to the face of the blade and the radial distance between said tip and the axis of said shaft remains unchanged upon resharpening; each of said discs being provided with four bores spaced apart along a common circle centered on the axis of said shaft and oriented diametrically in two pairs with the lines connecting the centers of each pair of bores including angles of 75° and 105° with each other, said knife shaft being of hexagonal configuration and said holes of said discs being of decahedral configuration.

2. A cutter for the comminution of meat, comprising:
a knife shaft having a polygonal configuration;
a plurality of holding discs mounted on said shaft, each of said holding discs having a polygonal hole in form-fitting engagement with the polygonal shaft; and
a plurality of knife blades each carried by a respective one of said discs and having a convex cutting edge, a concave trailing edge, and an outer edge defining with said trailing edge a tip, said cutting edge terminating ahead of said tip whereby resharpening of the cutting edge is limited to the face of the blade and the radial distance between said tip and the axis of said shaft remains unchanged upon resharpening, each of said knife blades comprising a pair of blade members lying in a common plane, said cutter further comprising pins axially inserted through each disc and the respective blade member and projecting partly into an adjacent disc.

3. The cutter defined in claim 2 further comprising elastic concentric supporting plates clamped between said holding discs and bea ring against said blade member, the diameter of said plates being greater than the diameter of said holding discs whereby said plates exert vibration-damping action on said blade members.

4. The cutter defined in claim 3 wherein a plurality of supporting plates of different diameters are provided on each face of each of said blades, the plates having the largest diameter bearing directly against said blades.

5. The cutter defined in claim 3 wherein said plates have a cross section decreasing outwardly.

* * * * *